United States Patent
Donetti et al.

(10) Patent No.: US 7,249,850 B2
(45) Date of Patent: Jul. 31, 2007

(54) METHOD FOR DETERMINATION OF AN OPHTHALMIC LENS USING AN ASTIGMATISM PRESCRIPTION FOR FAR SIGHT AND FOR NEAR SIGHT

(75) Inventors: Bérangère Donetti, Champigny-sur-Marne (FR); Cécile Petignaud, Villejuif (FR); Martha Hernandez, Charenton le Pont (FR)

(73) Assignee: Essilor International (Compagnie Generale d'Optique) (FR)

( * ) Notice: Subject to any disclaimer, the term of this patent is extended or adjusted under 35 U.S.C. 154(b) by 0 days.

(21) Appl. No.: 10/566,882

(22) PCT Filed: Jul. 27, 2004

(86) PCT No.: PCT/FR2004/002008

§ 371 (c)(1),
(2), (4) Date: Feb. 1, 2006

(87) PCT Pub. No.: WO2005/019905

PCT Pub. Date: Mar. 3, 2005

(65) Prior Publication Data

US 2006/0209255 A1    Sep. 21, 2006

(30) Foreign Application Priority Data

Aug. 8, 2003    (FR) .................................. 03 09787

(51) Int. Cl.
*G02C 7/02* (2006.01)

(52) U.S. Cl. ........................ 351/176; 351/159; 351/177
(58) Field of Classification Search ........ 351/159–176, 351/177
See application file for complete search history.

(56) References Cited

U.S. PATENT DOCUMENTS

| 5,270,746 | A | 12/1993 | Kato et al. |
| 5,335,026 | A | 8/1994 | Kato et al. |
| 6,142,625 | A * | 11/2000 | Sawano et al. ............. 351/161 |
| 6,382,789 | B1 | 5/2002 | Baudart et al. |

FOREIGN PATENT DOCUMENTS

| EP | 0461624 | 12/1991 |
| EP | 0949529 | 10/1999 |
| EP | 0990939 | 4/2000 |

\* cited by examiner

*Primary Examiner*—Scott J. Sugarman
*Assistant Examiner*—Darryl J. Collins
(74) *Attorney, Agent, or Firm*—Fish & Richardson P.C.

(57) ABSTRACT

A method is disclosed for determination of an ophthalmic lens for a wearer for whom a near-vision and far-vision astigmatism prescription has been made out, the near-vision astigmatism being different from the far-vision astigmatism. The method includes the steps of: choosing a starting lens and defining a current lens equal to the starting lens; optimization, in worn conditions, of the current lens using as a target the astigmatism for which the wearer has been giving a prescription for far vision and the astigmatism for which the wearer has been given a prescription for near vision.

9 Claims, 13 Drawing Sheets

Figure 1:
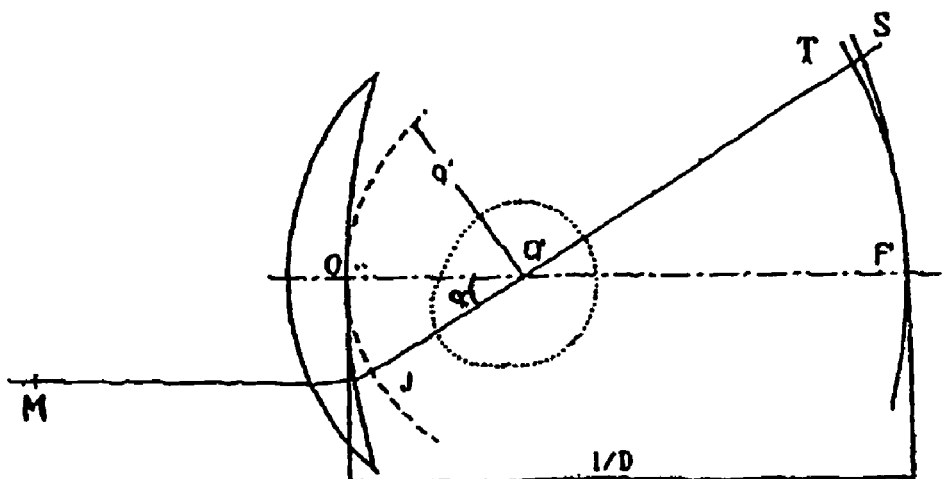

METHOD FOR DETERMINATION OF AN OPHTHALMIC LENS USING AN ASTIGMATISM PRESCRIPTION FOR FAR SIGHT AND FOR NEAR SIGHT

This application claims priority under 35 U.S.C. §371 to international application number PCT/FR2004/002008, filed Jul. 27, 2004, which in turn claims priority to French application number 03/09787, filed Aug. 8, 2003. These applications are herein incorporated by reference.

A subject of the present invention is a method for determination of an ophthalmic lens.

Ophthalmic prescription can include an astigmatism prescription. Such a prescription is produced by the ophthalmologist in the form of a pair formed by an axis value (in degrees) and an amplitude value (in diopters). On a surface, the amplitude value represents the difference $1/R1-1/R2$ between the principal curvatures; the axis value represents the orientation, relative to a reference axis and in a conventional direction of rotation, of the maximum curvature $1/R1$. In practice, the reference axis is horizontal and the direction of rotation is the counterclockwise direction, when looking at the wearer. An axis value of +45° therefore represents an obliquely orientated axis, which, when looking at the wearer, extends from the top-left quadrant to the bottom-right quadrant. In prescription terms, the amplitude value represents the difference between the minimum and maximum powers in a given direction and the axis represents the orientation of the maximum power. Such an astigmatism prescription is measured in far vision of the wearer. The term astigmatism is used for the pair (amplitude, angle); this term is also sometimes used, although this is linguistically incorrect, for the amplitude of the astigmatism. The context allows a person skilled in the art to understand which meaning is intended.

Independently of this astigmatism prescription, a wearer can be prescribed a positive or negative power correction. For presbyopic wearers, the value of the power correction is different for far vision and near vision, due to the difficulties of accommodation in near vision. The prescription thus comprises a far-vision power value and an addition representing the power increment between far vision and near vision. Lenses suitable for presbyopic wearers are progressive multifocal lenses; these lenses are described for example in FR-A-2 699 294, U.S. Pat. No. 5,270,745 or U.S. Pat. No. 5,272,495, FR-A-2 683 642, FR-A-2 699 294 or also FR-A-2 704 327. For young presbyopics, lenses have been proposed which do not have a far-vision zone with a reference point, unlike standard progressive multifocal lenses; these lenses are described in FR-A-2 588 973.

Moreover, the laws of the optics of ray tracings mean that optical defects appear when the light rays deviate from the central axis of any lens. These known defects, which include amongst others a curvature or power defect and an astigmatism defect, can be generically called obliquity defects of rays.

A person skilled in the art knows how to compensate for these defects. For example, EP-A-0 990 939 proposes a method for determination by optimization of an ophthalmic lens for a wearer for whom an astigmatism prescription has been made out. This document proposes choosing a target lens and using a ray tracing method and minimizing the difference between the residual astigmatism and the astigmatism of the target lens. Residual astigmatism is defined in this document as the amplitude and axis differences between the prescribed-for astigmatism and the astigmatism generated by the lens. This method allows a better adaption of the lenses to astigmatic wearers, avoiding the optical aberrations caused by the addition of a toric surface. The calculation is carried out at a reference point linked to the eye, which allows account to be taken of the torsion effect of the eye when the wearer looks in an off-centered direction. In the examples of this document, the astigmatism prescription is the only one, even though it is mentioned that the description of the method assumes that the astigmatism for which the far-vision prescription has been made out is in fact the astigmatism to be applied in each direction of viewing.

Still with a view to compensating for obliquity defects, U.S. Pat. No. 5,270,746 (EP-A-0 461 624) describes a unifocal lens in which one of the surfaces has a first section above the optical centre and a second section below the optical centre. The variation of curvature in the second section from the optical centre towards the periphery is less than the variation of curvature in the first section from the optical centre towards the periphery. The sought objective is the correction of the astigmatism in the upper section of the lens, for observed objects situated at a great distance; on the other hand, in the lower section of the lens, the astigmatism is corrected for objects situated at a small distance.

Figure 12:
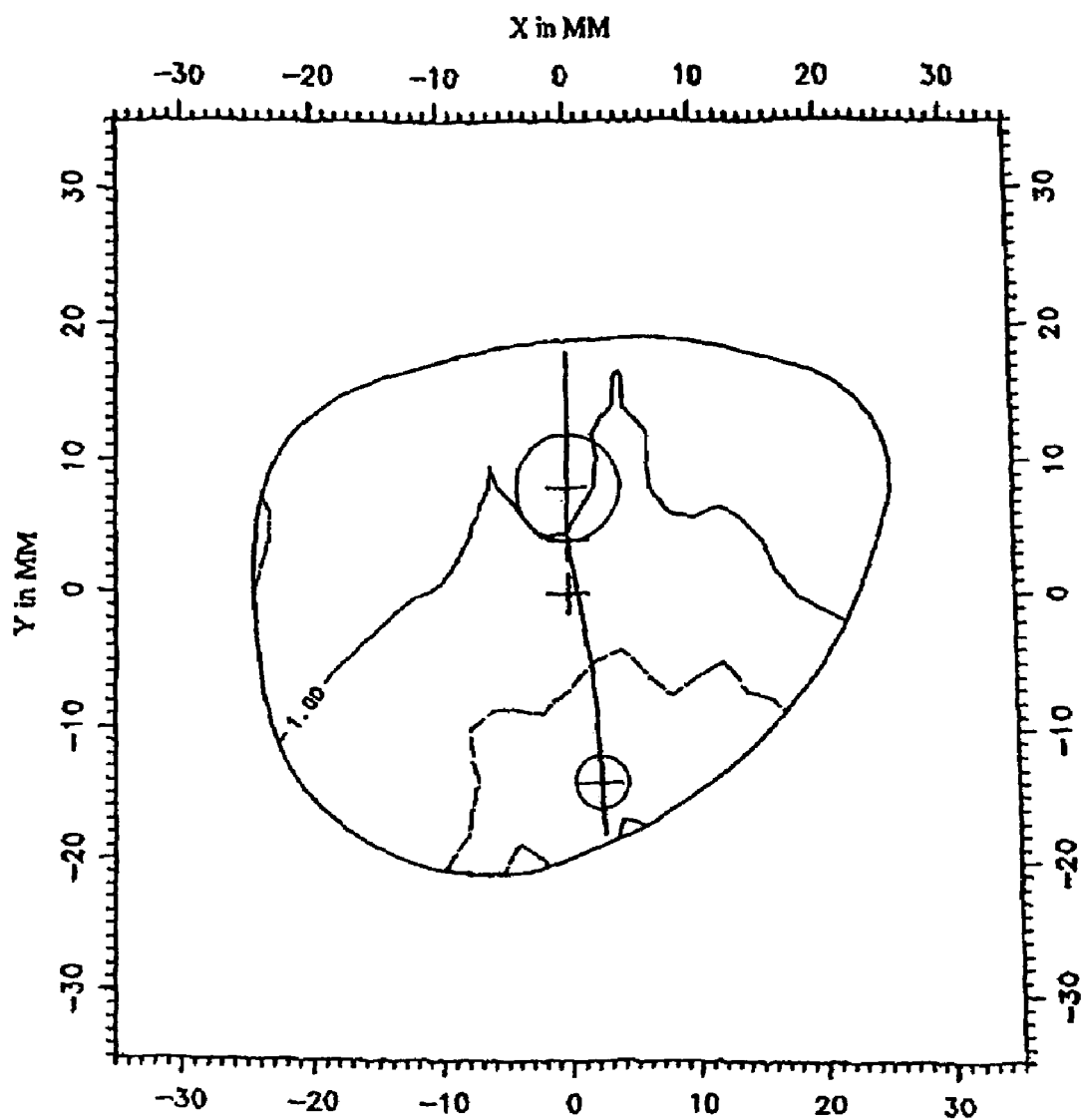

DE-A-18 05 561 (U.S. Pat. No. 3,722,986) describes a unifocal ophthalmic lens. In order to correct the astigmatism aberration of the lens, at least one of the surfaces is not spherical but has an ellipsoid shape or can be approximated by an ellipsoid. FIG. 12 of this document shows a unifocal lens which has an aspherical surface, with an astigmatism correction optimized in the upper section for far vision and optimized in the lower section for near vision.

The obliquity defects can also be compensated for multifocal lenses. For example, WO-A-98 12590 describes a method for determination by optimization of a set of multifocal ophthalmic lenses. This document proposes defining the set of lenses in consideration of the optical characteristics of the lenses and in particular the wearer power and oblique astigmatism, in worn conditions. The lens is optimized by ray tracing, using an ergorama linking a target object point with each direction of viewing in worn conditions.

A need still exists for a lens which is more satisfactory for astigmatic wearers, whether or not they are presbyopic.

Consequently, the invention proposes, in one embodiment, a method for determination of an ophthalmic lens for a wearer for whom a near-vision and far-vision astigmatism prescription has been made out, the near-vision astigmatism being different from the far-vision astigmatism, the method comprising the steps of:
  choosing a starting lens and defining of a current lens equal to the starting lens;
  optimizing, in worn conditions, the current lens using as a target the astigmatism for which the wearer has been given a prescription for far vision and the astigmatism for which the wearer has been given a prescription for near vision.

In one embodiment, the astigmatism for which a near-vision prescription has been made out is measured in binocular vision. The astigmatism is advantageously measured in a reference frame linked to the eye.

The target can also include a power prescribed for the wearer in near vision and/or in far vision. The optimization can include the definition of a principal meridian and the use as target of a continuous progression of the amplitude of astigmatism along the meridian.

The optimization can also include the definition of a principal meridian and the use as target of a continuous progression of the axis of astigmatism along the meridian.

The invention also proposes a lens obtained by such a method.

Figure 2:
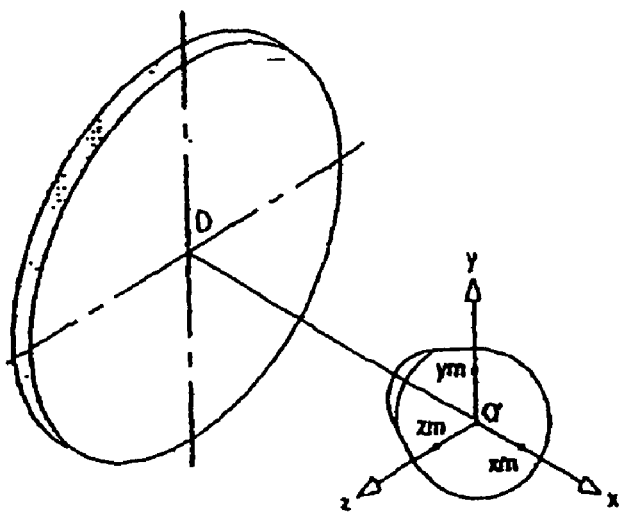
Figure 3:
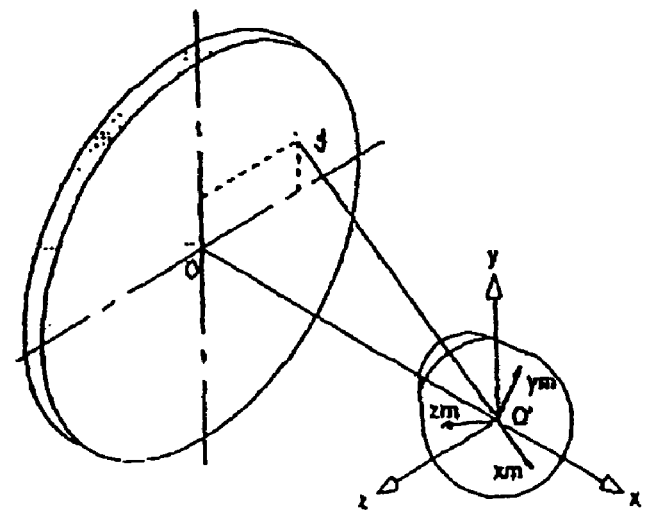
Figure 8:
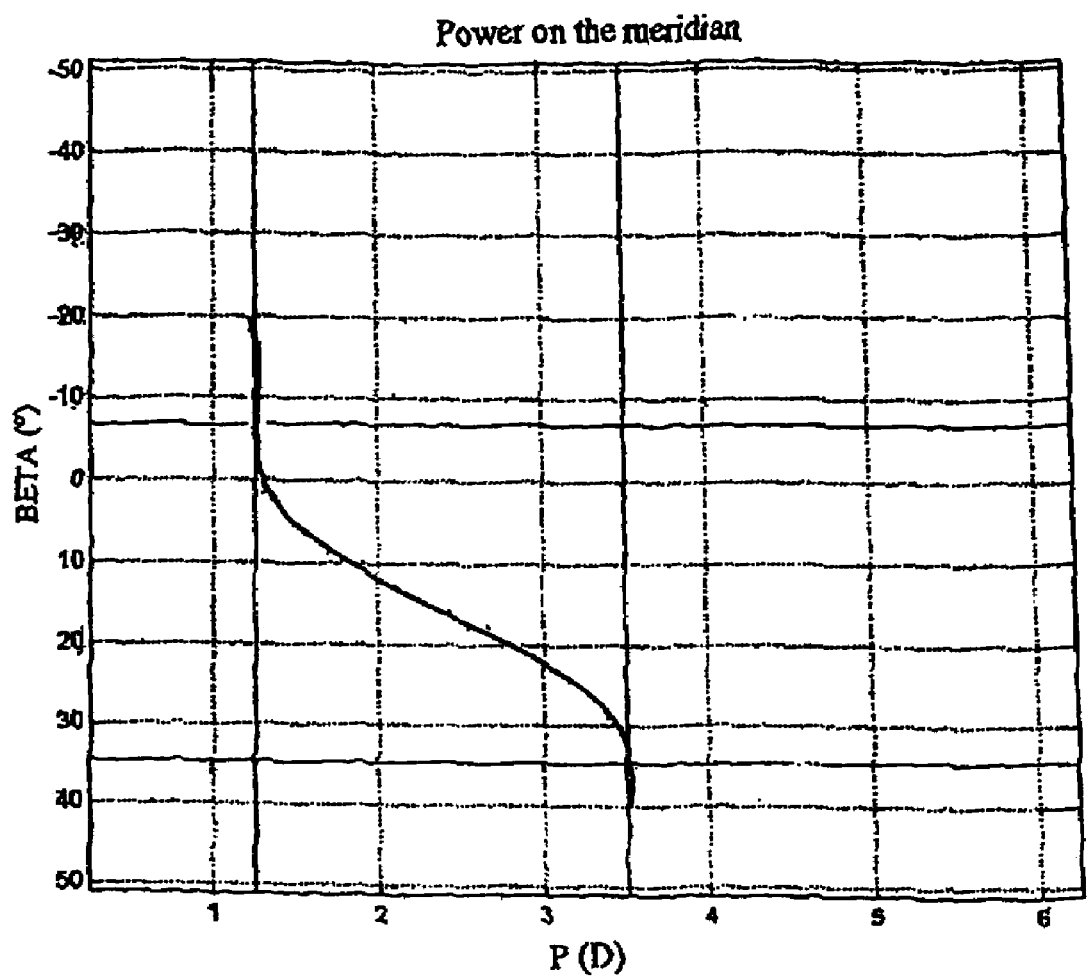
Figure 9:
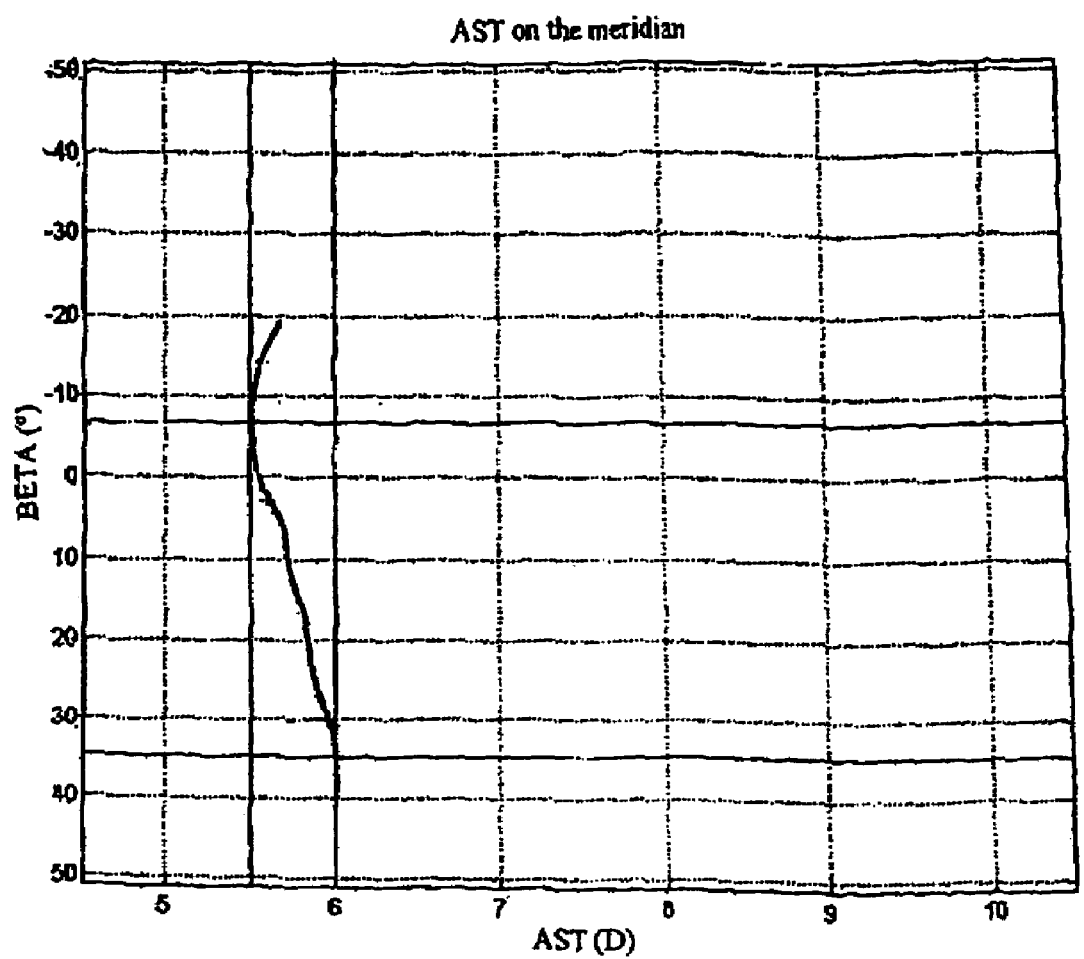
Figure 10:
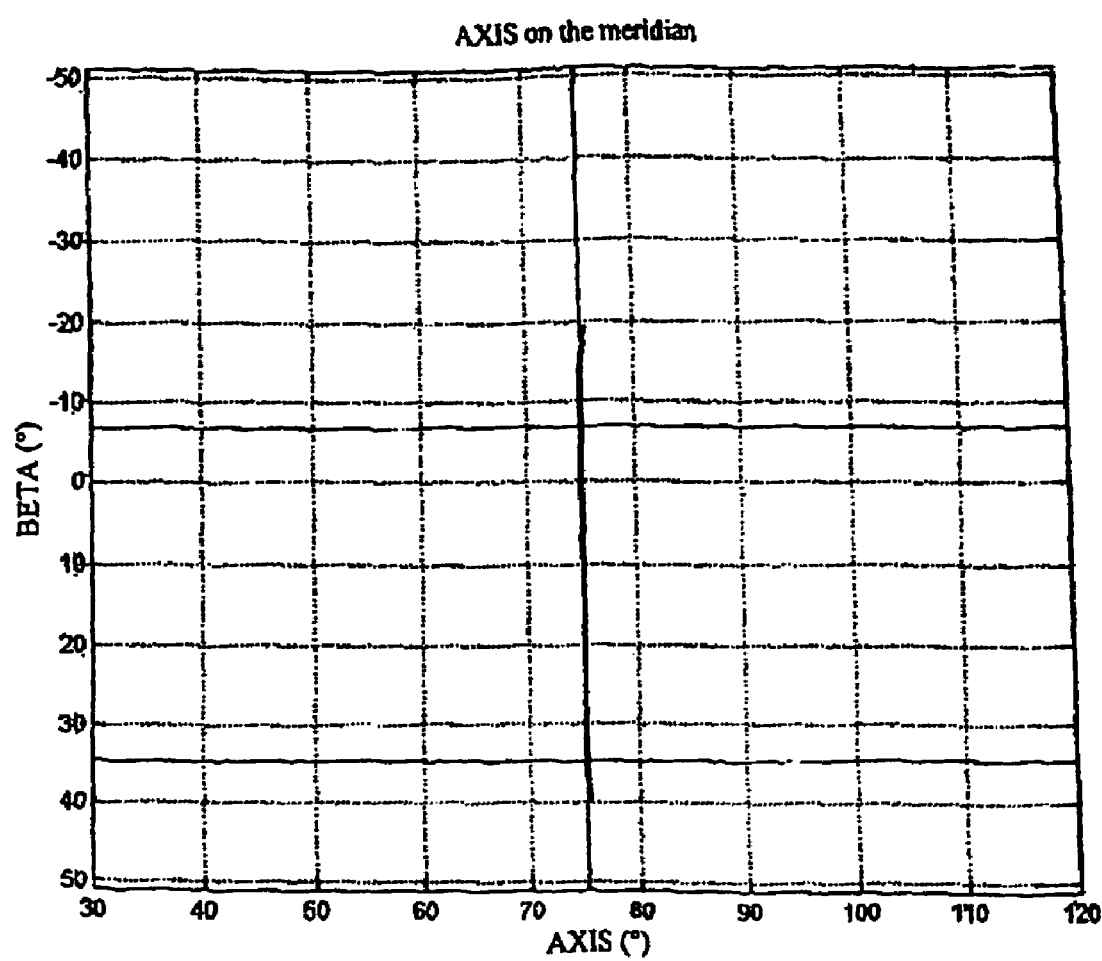
Figure 11:
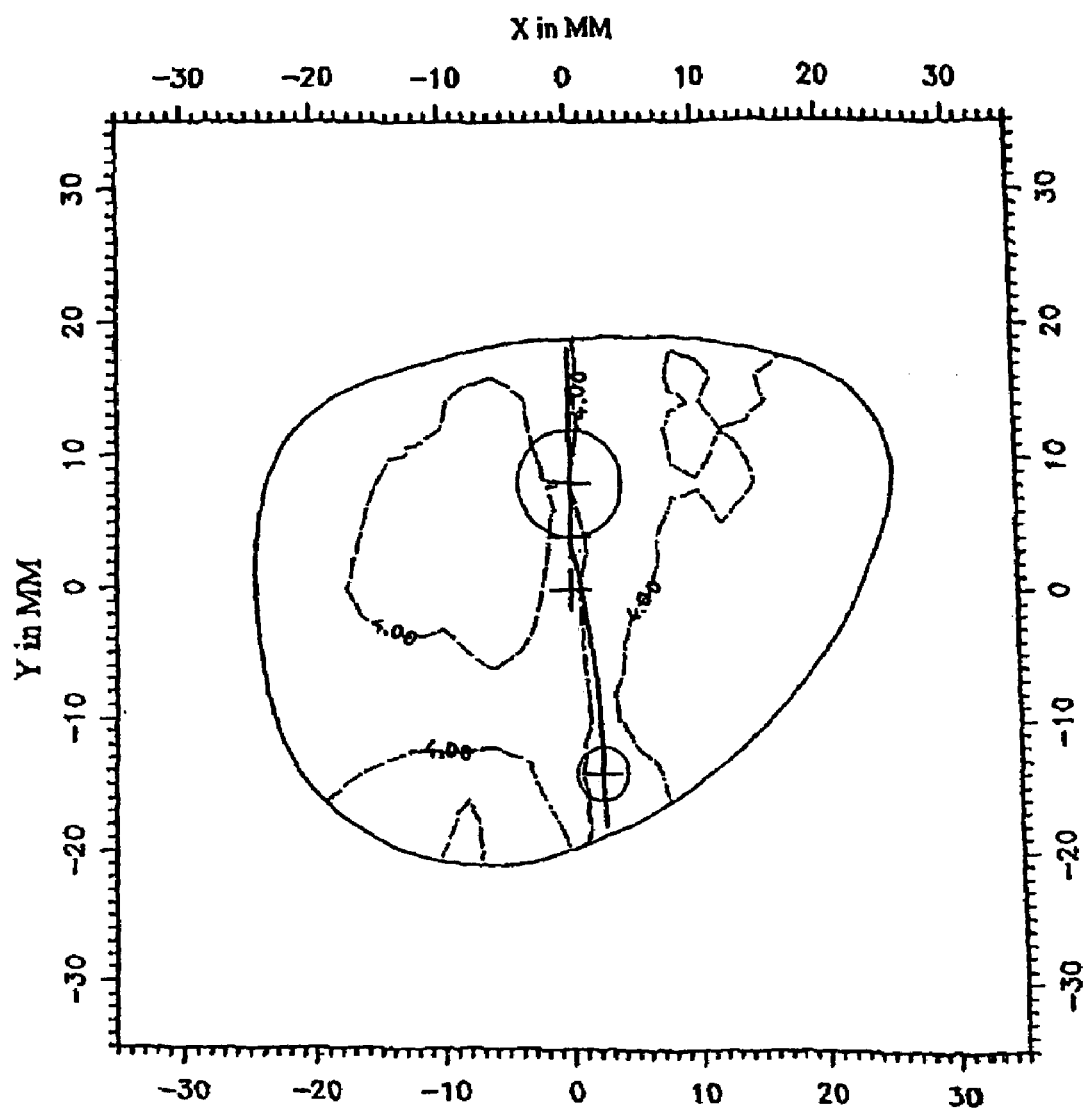
Figure 13:
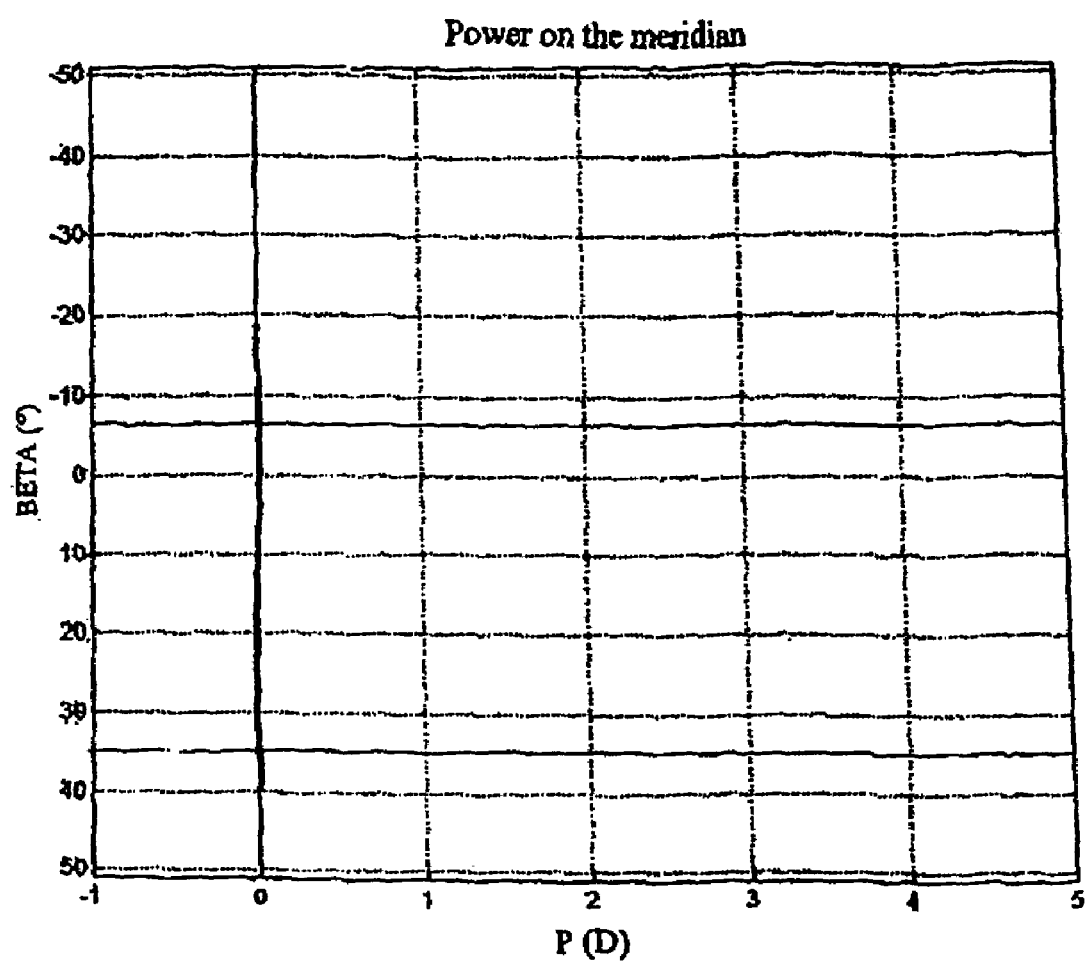
Figure 14:
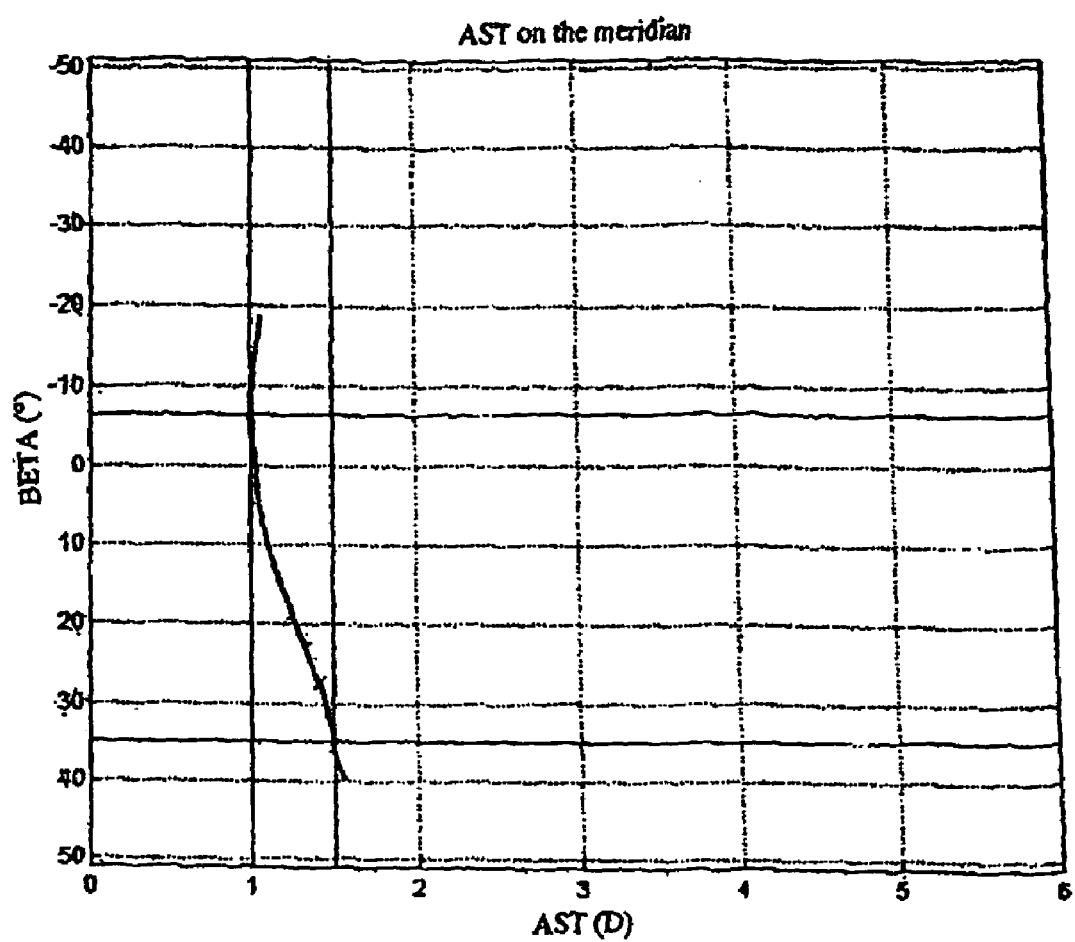
Figure 15:
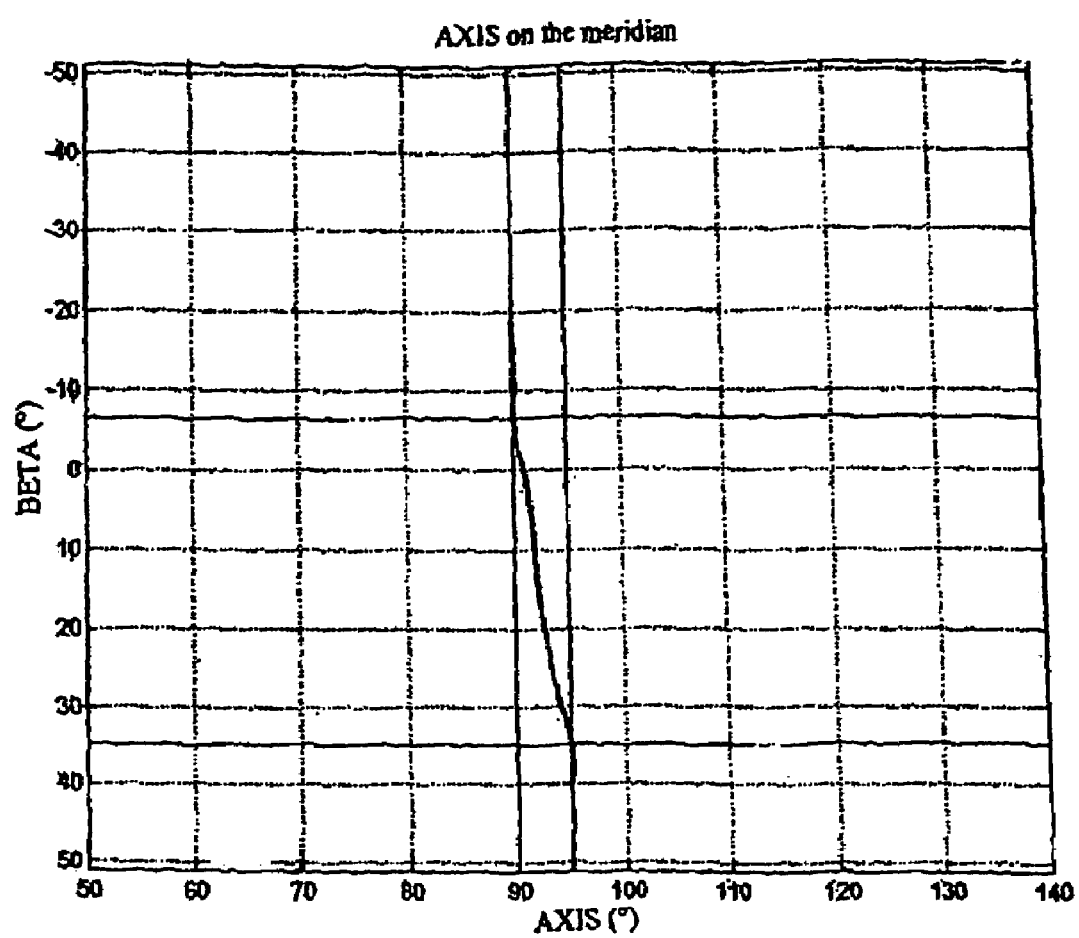

Other advantages and characteristics of the invention will become apparent on reading the following description of the embodiments of the invention, given by way of example and with reference to the drawings which show:

FIG. 1, a diagram of an eye-lens optical system, in top view;

FIGS. 2 and 3, perspective diagrams of an eye-lens system;

FIGS. 4 to 7, mean-sphere and cylinder maps of the faces of a lens according to a first embodiment of the invention;

FIGS. 8 to 10, graphs showing power, amplitude of astigmatism and axis of astigmatism along the meridian of this lens according to the first embodiment;

FIGS. 11 and 12, mean-sphere and cylinder maps of a face of a lens according to a second embodiment of the invention;

FIGS. 13 to 15, graphs showing power, amplitude of astigmatism and axis of astigmatism along the meridian of this lens according to the second embodiment.

In a manner known per se, at any point of an aspherical surface, a mean sphere D given by the formula:

$$D = \frac{n-1}{2}\left(\frac{1}{R_1} + \frac{1}{R_2}\right)$$

is defined, where $R_1$ and $R_2$ are the maximum and minimum curvature radii expressed in meters, and n is the index of the material constituting the lens.

A cylinder C, given by the formula:

$$C = (n-1)\left|\frac{1}{R_1} - \frac{1}{R_2}\right|,$$

is thus defined.

For a given lens, the corresponding optical variables are defined, namely a power and an astigmatism, in worn conditions. FIG. 1 shows a diagram of an eye-and-lens optical system in top view, and shows the definitions used hereafter in the description. The centre of rotation of the eye is called Q'; the axis Q'F' represented in the figure in chain-dotted lines is the horizontal axis passing through the centre of rotation of the eye and continuing in front of the wearer—in other words the axis Q'F' corresponds to the primary viewing direction. This axis cuts, on the front face, a point on the lens called the fitting cross, which is marked on the lenses in order to allow their positioning by an optician. The fitting cross is generally situated 4 mm above the geometric centre of the front face. Let point O be the point of intersection of the rear face and this axis Q'F'. A sphere of the vertices is defined, with a centre Q', and a radius q', which cuts the rear face of the lens at the point O. By way of example, a radius q' value of 27 mm corresponds to a current value and produces satisfactory results when the lenses are worn. The section of the lens can be drawn in the plane (O, x, y) which is defined with reference to FIG. 2. The tangent to this curve at the point O is inclined relative to the axis (O, y) at an angle called the pantoscopic angle. The value of the pantoscopic angle is currently 12°. The section of the lens can also be drawn in the plane (O, x, z). The tangent to this curve at the point O is inclined relative to the axis (O, z) at an angle called the curving contour. The value of the curving contour is currently 0°.

These conditions of fitting of the lens relative to the eye, namely:

a distance of 27 mm between the centre of rotation of the eye and the rear face of the lens, on the axis Q'F';

a pantoscopic angle of 12°;

a curving contour of 0° are hereafter called worn conditions.

These values are those chosen for the examples described but they can vary in order to be equal to values peculiar to each individual.

A given direction of viewing—represented in solid lines in FIG. 1—corresponds to a position of the eye in rotation about Q' and to a point J of the sphere of the vertices; a direction of viewing can also be marked, in spherical coordinates, by two angles α and β. The angle α is the angle formed between the axis Q'F' and the projection of the straight line Q'J over the horizontal plane containing the axis Q'F'; this angle appears in the diagram of FIG. 1. The angle β is the angle formed between the axis Q'F' and the projection of the straight line Q'J over the vertical plane containing the axis Q'F'. A given direction of viewing therefore corresponds to a point J of the sphere of the vertices or to a pair (α, β).

In a given direction of viewing, the image of a point M of the object space situated at a given object distance forms between two points S and T corresponding to minimum and maximum distances JS and JT (which are sagittal and tangential focal distances in the case of revolution surfaces, and of a point M at infinity). The angle γ marked as the axis of astigmatism is the angle formed by the image corresponding to the smallest distance with the axis $(z_m)$, in the plane $(z_m, y_m)$ defined with reference to FIGS. 2 and 3. The angle γ is measured in counterclockwise direction when looking at the wearer. In the example of the figure, on the axis Q'F', the image of a point of the object space at infinity forms at the point F'; the points S and T have merged, which is another way of saying that the lens is locally spherical in the primary direction of viewing. The distance D is the rear front end of the lens.

A function linking the usual distance of the object point with each direction of viewing is called an ergorama. Typically, in far vision in the primary direction of viewing, the object point is at infinity. In near vision, in a direction more or less corresponding to an angle α of the order of 5° and to an angle β of the order of 35°, the object distance is of the order of 30 to 50 cm. For more details of a possible definition of an ergorama, FR-A-2 753 805 (U.S. Pat. No. 6,318,859) may be consulted. This document describes an ergorama, its definition and a method for its modelization. A particular ergorama consists of taking only points at infinity. For the method of the invention, points at infinity or not at infinity can be considered. The ergorama can also be a function of the ametropia of the wearer.

Using these data, a power and an astigmatism can be defined in each direction of viewing. For a direction of viewing (α,β), an object point M at an object distance given by the ergorama is considered. The points S and T between which the image of the object forms are determined. The image proximity IP is then given by $$IP = \frac{1}{2}\left(\frac{1}{JT} + \frac{1}{JS}\right)$$

while the object proximity OP is the reciprocal of the distance between the point M and the point J of the sphere of the vertices. The power is defined as the sum of the object and image proximities, i.e.

$$P = OP + IP = \frac{1}{MJ} + \frac{1}{2}\left(\frac{1}{JT} + \frac{1}{JS}\right)$$

The amplitude of the astigmatism is given by $$A = \left|\frac{1}{JT} - \frac{1}{JS}\right|$$

The angle of the astigmatism is the angle $\gamma$ defined above: it is the angle measured in a reference frame linked to the eye, relative to the direction $z_m$, with which the image T forms, in the plane $(z_m, y_m)$. These definitions of power and of astigmatism are optical definitions, in worn conditions and in a reference frame linked to the eye. Qualitatively, the thus-defined power and astigmatism correspond to the characteristics of a thin lens, which, fitted instead of the lens in the direction of viewing, provides the same images locally. It is noted that, in the primary direction of viewing, the definition provides the standard value of the astigmatism.

The thus-defined power and astigmatism can be experimentally measured on the lens using a frontofocometer; they can also be calculated by ray tracing in worn conditions.

In order to approximate the formula used by ophthalmologists when prescribing, the maximum power of the lens can also be defined as:

$$P_{max} = \frac{1}{MJ} + \frac{1}{JT}$$

and the minimum power as:

$$P_{min} = \frac{1}{MJ} + \frac{1}{JS}$$

Ophthalmologists prescribe for power and for astigmatism, providing either:
  the minimum value of the power $P_{min}$ and a positive astigmatism amplitude value;
  the maximum value of the power $P_{max}$ and a negative astigmatism amplitude value.

It is clear that the astigmatism angle values in the prescription vary according to the prescription formula used. In each of the two prescription formulae, the angle that the image, S or T, forms is given, corresponding to the recommended power, with the axis Z, measured in counterclockwise direction when looking at the wearer. In the description of the state of the art given above, the prescription formula is that using the maximum value of the power and a negative astigmatism amplitude value.

FIGS. 2 and 3 show perspective diagrams of an eye-lens system. FIG. 2 shows the position of the eye and of the reference frame linked to the eye, in the principal viewing direction, $\alpha=\beta=0$, called the primary viewing direction. The points J and O have thus merged. FIG. 3 shows the position of the eye and of the reference frame which is linked to it in one direction ($\alpha, \beta$). In FIGS. 2 and 3 a fixed reference frame $\{x, y, z\}$ and a reference frame $\{x_m, y_m, z_m\}$ linked to the eye are represented, in order to show the rotation of the eye clearly. The origin of the fixed reference frame $\{x, y, z\}$ is the point Q'; the axis x is the axis Q'F'—the point F' is not represented in FIGS. 2 and 3 and passes through the point 0; this axis is orientated from the lens towards the eye, in agreement with the direction of measurement of the axis of astigmatism. The plane $\{y, z\}$ is the vertical plane; the y axis is vertical and orientated upwards; the z axis is horizontal, the reference frame being directly orthonormalized. The reference fame $\{x_m, y_m, z_m\}$ linked to the eye has the point Q' as its centre; the axis $x_m$ is given by the direction JQ' of viewing, and coincides with the reference frame $\{x, y, z\}$ for the primary direction of viewing. Listing's law gives the relationships between the reference frames $\{x, y, z\}$ and $\{x_m, y_m, z_m\}$, for each direction of viewing, see Legrand, *Optique Physiologique*, Volume 1, Edition de la Revue d'Optique, Paris 1965.

The invention proposes, in order to determine the characteristics of an ophthalmic lens, to consider the astigmatism prescription made out for the wearer, not only in far vision, but also in near vision. It is based on the observation that the rotation and the deformation of the elements constituting the eye when the wearer changes from far vision to near vision produce variations of astigmatism. These variations of physiological origin, linked to the deformation of the eye, can, according to the invention, be corrected by the lens placed in front of the eye, taking into account the obliquity defects and the variations of the astigmatism, specific to the lens considered, caused by the conditions of sight, in other words by the variations in the object distance between far vision and near vision. The invention therefore proposes to determine the ophthalmic lens using prescriptions measured in far vision, but also in near vision in worn conditions, in particular in binocular vision. The characteristics of the lens can be determined by optimization, as described below. The invention is applied as soon as the astigmatism prescribed for in far vision differs from that prescribed for in near vision, whether this is by amplitude, by angle or by amplitude and angle.

The solution applies not only to multifocal progressive lenses, as in the example of FIGS. 4 to 10 below, but also to unifocal lenses, as in the example of FIGS. 11 to 15 below.

The invention assumes that a wearer has been given a prescription for far vision and near vision. In far vision, the prescription can be measured on the wearer, in standard conditions for measurement of the prescription; the power and the astigmatism of the eye are measured in worn conditions, for an object at an infinite distance, in a direction of viewing which is the primary direction of viewing.

In near vision, it is advantageous to measure the prescription for binocular vision of the wearer. This measurement ensures that the eye is indeed in a position corresponding to the usual position in near vision. Such a measurement ensures that the following are taken into account:
  the variations of astigmatism resulting from the variations of proximity of the object point;
  the variations of astigmatism resulting from the deformation of the eye during its rotation and accommodation.

The measurement can be made in reading conditions, in a position which corresponds to the usual reading distance of the wearer, typically between 30 and 50 cm. These measurements provide, in far vision as in near vision, a power value, an astigmatism value and an astigmatism angle value. These values are hereafter referred to as $P_{minF}$, $A_F$ and $\gamma_F$ for far vision and $P_{minN}$, $A_N$ and $\gamma_N$ for near vision. These values are given in a prescription formula giving the minimum power value and a positive astigmatism amplitude. The same calculation could be made in the other prescription formula. Near-vision and far-vision prescriptions can vary by one, two or three values of the triplet. The mean power in far vision FV, referred to as $P_F$, and the mean power in near vision NV, referred to as $P_N$, can be calculated in the following way: $P_F = P_{minF} + A_F/2$, and $P_N = P_{minN} + A_N/2$. A variation of power, i.e. a difference $(P_N - P_F)$ other than nil, represents an increase in power, similar to that of a progressive lens of the state of the art. The addition of power of the lens can be defined as being equal to $(P_N - P_F)$. A variation of the astigmatism and/or of its direction, i.e. of the differences $(A_N - A_F)$ and $(\gamma_N - \gamma_F)$ neither of which is nil represents a variation of astigmatism between far vision and near vision, as used in the present invention.

Knowing the triplets $(P_{minF}, A_F, \gamma_F)$ and $(P_{minN}, A_N, \gamma_N)$, the lens is determined so as to have, in worn conditions, the required power and astigmatism values, in far vision as in near vision. It is then possible to proceed, as is known per se, by optimization in order to define the lens. Examples of starting surfaces are given below; the targets can simply be the proposed prescriptions, in the directions of viewing corresponding to far vision and to near vision.

Figure 4:
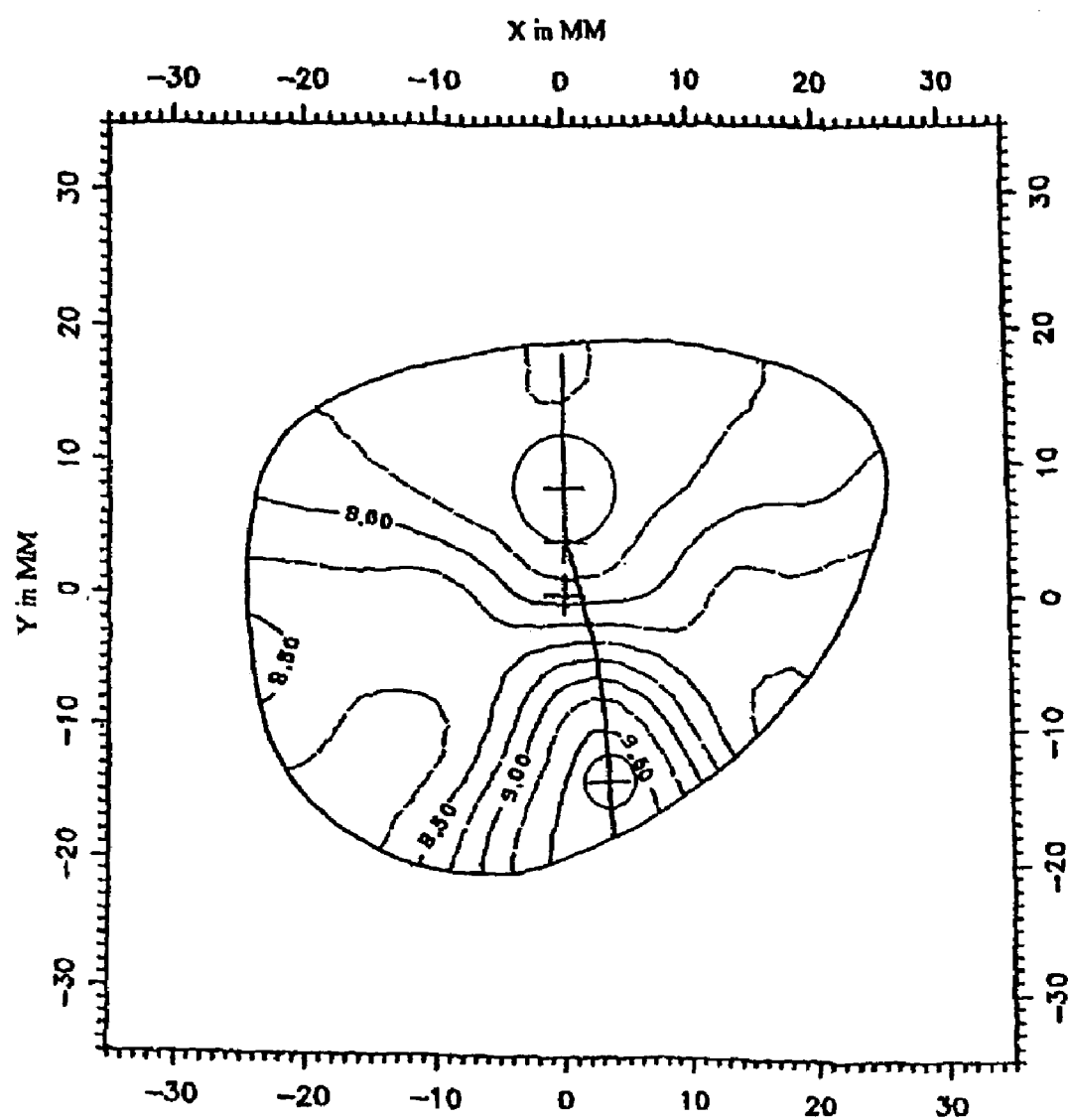
Figure 5:
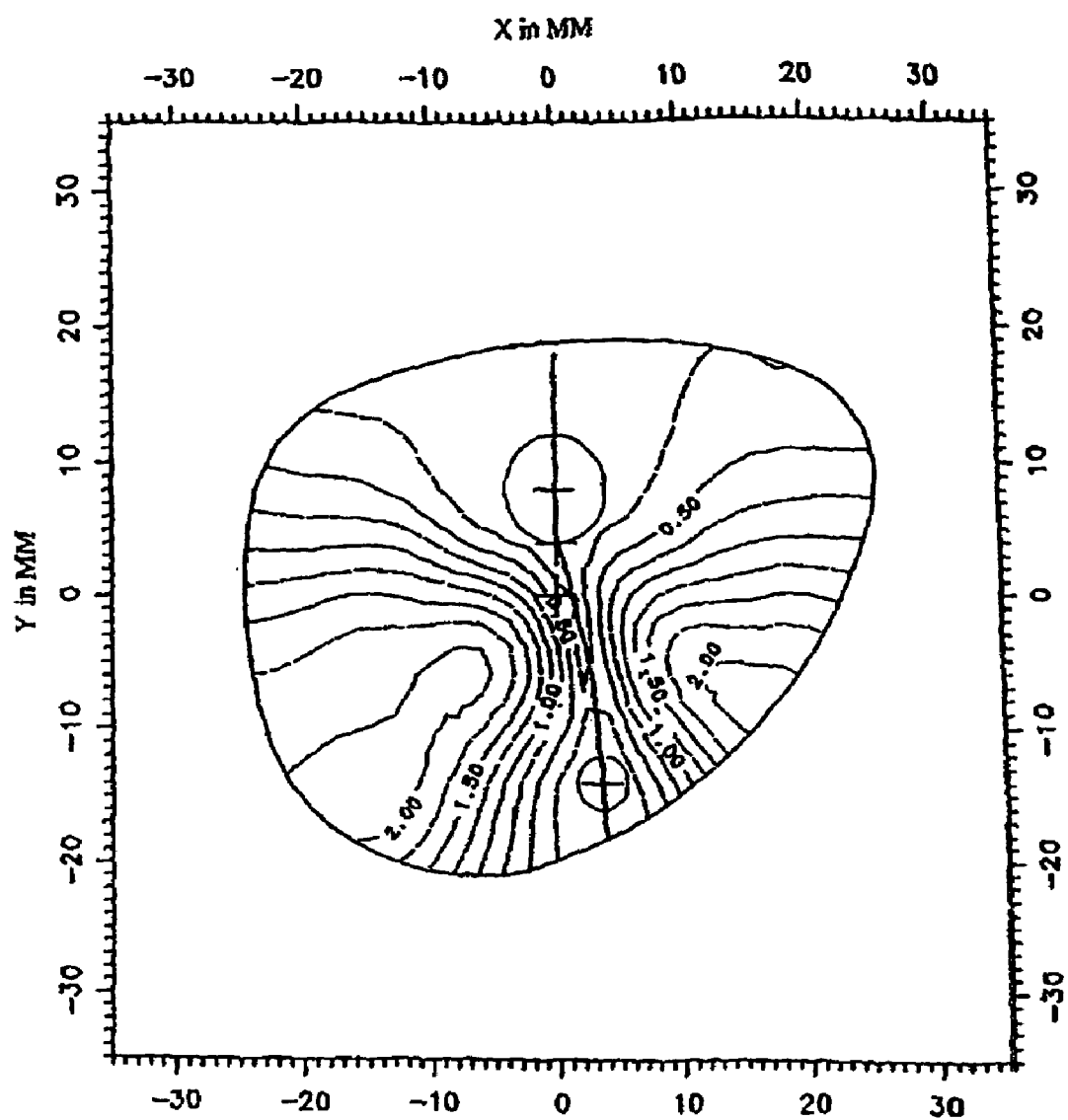
Figure 6:
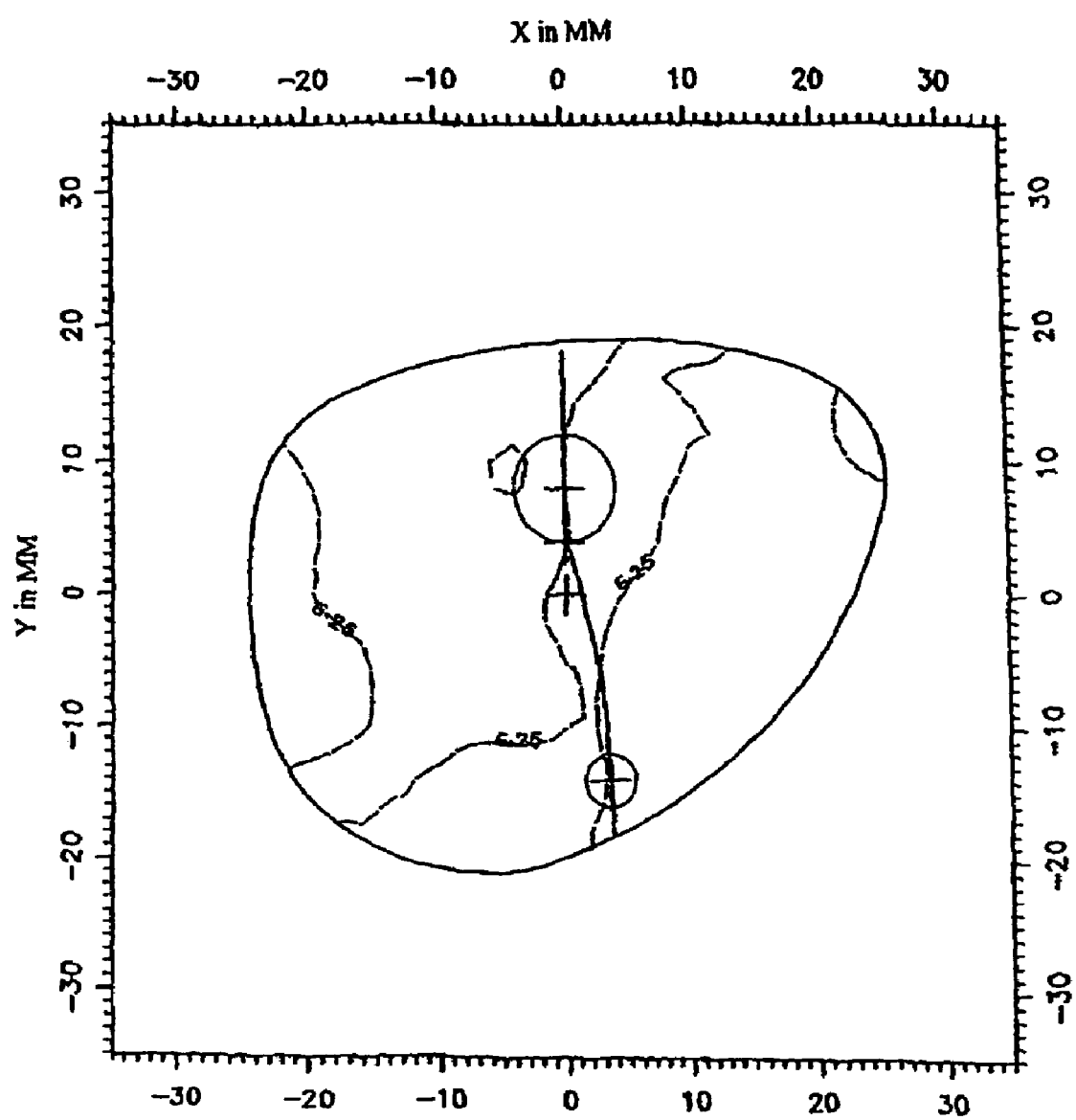
Figure 7:
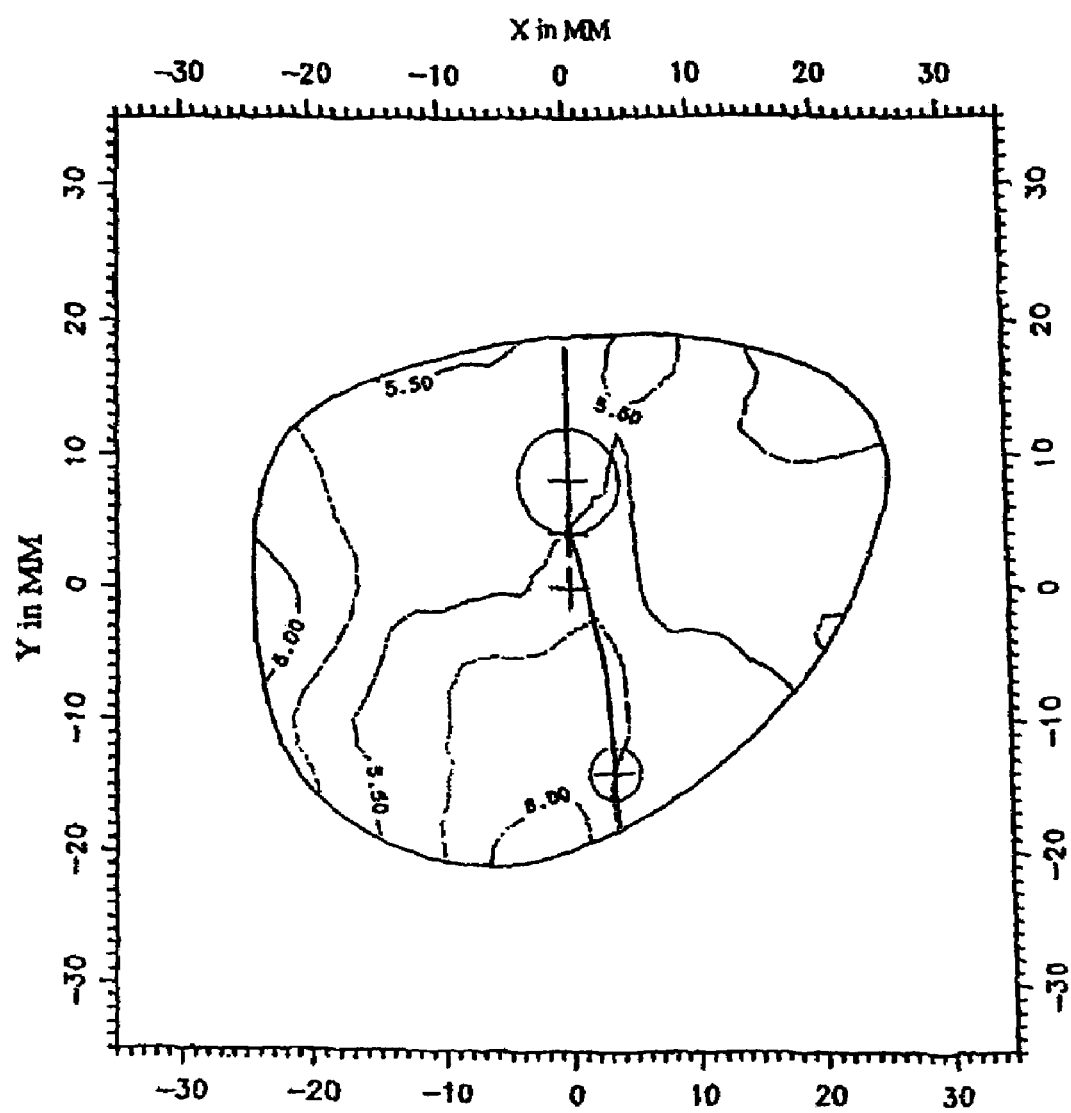

FIGS. 4 to 10 show the example of a lens according to the invention, in the case of prescriptions having an addition of power between far vision and near vision. In this example, the rear face of the lens is optimized and a multifocal progressive face known per se is used for the front face. FIG. 4 is a representation of the mean sphere of the front face of the lens. FIG. 5 is a representation of the cylinder of the front face of the lens. FIGS. 6 and 7 are representations of the mean sphere of the cylinder of the rear face of the lens; in the example, the rear face of the lens is obtained by optimization according to the invention. FIG. 8 is a graph of the power along the meridian, FIG. 9 is a graph of the amplitude of the astigmatism along the meridian and FIG. 10 is a graph of the axis of the astigmatism along the meridian.

In the example of the figure, a far-vision prescription $(P_{mjnF}, A_F, \gamma_F)$ equalling $(-1.50, 5.50, 75)$ and a near-vision prescription $(P_{minN}, A_N, \gamma_N)$ equalling $(0.50, 6.00, 75)$ are considered. These values are given in a prescription formula giving the minimum power value and a positive astigmatism amplitude. This corresponds to mean powers of $P_F = 1.25$ diopters in far vision and $P_N = 3.50$ diopters in near vision. The optimization is carried out on the rear face of the lens. For the front face of the lens, a progressive multifocal surface having the required addition of power $P_N - P_F$ is used. FIGS. 4 and 5 show the sphere and cylinder maps of this front face; it can typically be the surface of the lenses marketed by the applicant under the mark PANAMIC; surfaces of this type and their properties are described in the applications FR-A-2 769 998 (U.S. Pat. No. 5,949,519), FR-A-2 769 999 (EP-A-0 911 672) or also FR-A-2 770 000 (EP-A-0 911 670).

In order to carry out the optimization, a lens having this front surface is considered as a starting lens. The rear surface is determined in the following way: the lens is considered in worn conditions, with a distance q' value of 27 mm, a pantoscopic angle value of 12°, and a curving contour value of 0°, as proposed above. A lens thickness at the centre is chosen, for example a thickness of 4 mm. In the example a lens index n=1.561 is considered. A direction of viewing defined by a point FV situated 8 mm above the geometric centre of the lens is considered. For this direction of viewing, the toric rear face necessary in order for the lens, in worn conditions, to satisfy the prescription considered is then determined; the rear face can be determined by ray tracing, calculating the two curvatures of the rear face in the given direction of viewing.

The direction of viewing in near vision can be fixed for an average wearer, if appropriate taking account of the interpupillary distance; the direction of viewing defined by the reference point for near vision on the front face of the lens can also be used as direction of viewing.

It is understood that this starting lens has, in the near-vision zone, a power close to the power $P_N$. It is also understood that there is no reason for the starting lens to have, in the near-vision zone, an astigmatism or angle value close to the $A_N$ and $\gamma_N$ values prescribed in near vision.

Targets for the optimization are then fixed. As a minimum, the values of the prescription in a direction of viewing corresponding to far vision and in a direction of viewing corresponding to near vision can be used as targets. The direction of viewing corresponding to near vision is fixed as indicated in the preceding paragraphs.

Other target values can also be used for the optimization. For this purpose it is possible to define a principal meridian, which corresponds to a set of directions of viewing between the reference direction for far vision and the reference direction for near vision. A first solution for defining this meridian consists of determining the directions of viewing corresponding to rays passing through the principal meridian of the front face of the lens. Another solution consists of calculating the meridian using the ergorama and the interpupillary distance.

Once the meridian is defined, values of the variations of mean powers used for the optimization of the progressive faces in the state of the art can be applied as optical power targets along this meridian.

For the astigmatism, the following targets can be used on the meridian: in the part of the meridian extending above the fitting cross, the values $A_F$ and $\gamma_F$ prescribed in far vision are used as targets. In the part of the meridian extending below the reference direction for near vision and 4 mm above this reference direction, the values $A_N$ and $\gamma_N$ prescribed in near vision are used as targets. Between these two zones, a continuous variation of the amplitude or of the angle of the astigmatism is imposed; this variation is for example linear; if appropriate the variation of the amplitude and/or of the angle can be adjusted in order to prevent gradient breaks.

Target values outside the meridian can also be envisaged. For the power, at any point power targets corresponding to the desired power distribution can be used, according to the state of the art used for progressive lenses. In other words, the power target values used in the state of the art for the optimization of progressive lenses can be used outside the meridian. The power values obtained outside the meridian for a progressive lens of the state of the art having the desired addition of power can also be used.

For the astigmatism and astigmatism angle target values outside the meridian, in one embodiment of the invention, values determined using a progressive lens of the state of the art can be used. A progressive lens of the state of the art, having the desired addition of power, is considered. A direction $(\alpha, \beta)$ of viewing, in a reference frame linked to the eye, is considered and amplitude values $A'(\alpha, \beta)$ and astigmatism angle values $\gamma'(\alpha, \beta)$ are obtained for the lens of the state of the art. At the same level $\beta$ of viewing, the lens of the state of the art has amplitude values $A_M'(\beta)$ and astigmatism angle values $\gamma_M'(\beta)$ on the meridian. Marking $A_M(\beta)$ and $\gamma_M(\beta)$ the amplitude and astigmatism angle values on the meridian, defined as indicated above, and used as targets on the meridian, there may be used as targets:

$$A'(\alpha, \beta)+A_M(\alpha, \beta)-A_{M'}(\alpha, \beta)$$

for the amplitude of astigmatism and $$\gamma'(\alpha, \beta)+\gamma_{M'}(\beta)$$

for the angle of astigmatism. In other words, the target values outside the meridian are determined using values of a lens of the state of the art in the same direction of viewing, corrected in order to take account of the target values on the meridian at the same level of viewing, in the Listing reference frame linked to the eye.

It is advantageous, but not essential, to provide more numerous targets on the meridian and around it than in the peripheral part of the lens.

Once the targets are defined, the lens is determined by optimization. For this purpose, a current lens is considered; on initialization, this current lens is the starting lens. The characteristics of the current lens are varied in order to approach the target values. For this optimization, various representations can be used of the surface or surfaces which vary. In the example, only the rear face of the lens is varied, but the front face could also be varied. The face or faces which vary can be represented by Zernicke polynomials; an aspherical layer, superposed on one or other of the faces, can be used and this aspherical layer can be varied.

The optimization can use the techniques which are known per se. In particular, the method of optimization by damped least squares (DLS) can be used.

FIGS. 6 and 7 show sphere and cylinder maps of the rear face of the lens, which is obtained by optimization according to the invention. FIG. 6 shows that the mean sphere along the meridian is more or less constant on the rear face; this is not surprising in as far as, at a first approximation, the power increment is obtained by the mean sphere increase on the front face. FIG. 7 on the other hand shows that the amplitude of the cylinder varies from the far vision zone to the near vision zone; again, this is not surprising in as far as the cylinder on the front face is more or less nil along the meridian. The variations of the axis of the cylinder are not represented in the figures.

FIG. 8 is a graph of the optical power along the meridian; the angle β has been laid off as ordinate and the power as abscissa. The figure shows a more or less constant power in far vision, around the value $P_F$, a more or less constant power in near vision, around the value $P_N$, and a regular increase in the power along the meridian.

FIG. 9 is a graph of the amplitude of the astigmatism along the meridian; the angle β has been laid off as ordinate and the amplitude of astigmatism as abscissa. The figure shows a more or less constant amplitude around the point FV and around the value $A_F$, a more or less constant amplitude in near vision, around the value $A_N$, and a regular increase in the amplitude along the meridian, representing the targets discussed above.

FIG. 10 is a graph of the axis of the astigmatism along the meridian; the angle β has been laid off as ordinate and the axis of the astigmatism as abscissa. The figure shows that the axis remains more or less constant, following the targets.

In the example of FIGS. 4 to 10, the choice of the front face leads to a distribution of the power progression over the front face, in the form of a mean-sphere progression, and the increase in astigmatism on the rear face, in the form of a cylinder progression. This solution is advantageous in as far as it makes it possible to capitalize on the work of the state of the art for progressive multifocal lenses. However, it would be possible to mix the two increases, or to choose a different distribution.

FIGS. 11 to 15 show another example in a case where the far-vision prescription ($P_{minF}$, $A_F$, $\gamma_F$) equals (−0.50, 1.00, 90) and the near-vision prescription ($P_{minN}$, $A_N$, $\gamma_N$) equals (−0.75, 1.5, 95), still in the same prescription formula. These prescriptions correspond to the mean powers $P_F=P_N=0$. The values $P_F$ and $P_N$ are identical, but the amplitude and axis of astigmatism values vary between far vision and near vision. A unifocal lens having the values of a far-vision prescription, with an optimized centre thickness, is used for the starting lens. The distance q', pantoscopic angle, curving contour and lens index values are identical to those of the previous example. The front face has the following characteristics:

Radius of curvature R1=R2=140 mm.

while the starting rear face for the optimization is a toric surface and has the following characteristics:

$R_1$=124.71 mm; $R_2$=157.90 mm; Axis=90°.

For the optimization, only the rear face is varied. The targets are chosen as explained above. The optimization leads to the results represented in the figures. The mean-sphere and cylinder maps of the front face are not represented; this surface being spherical, the mean sphere is constant and the cylinder is constant and nil over the whole surface. FIG. 11, which represents the mean sphere, shows that the mean sphere remains more or less constant on the rear face. FIG. 12, which represents the cylinder of the rear face, shows that the cylinder grows, more or less in proportion to the growth in the amplitude of the astigmatism prescription between far vision and near vision. FIGS. 13, 14 and 15 are similar to FIGS. 8, 9 and 10. FIG. 13 shows that the optical power remains more or less constant on the meridian. FIG. 14 shows the progressive character of the increase in amplitude of astigmatism between far vision and near vision. FIG. 15 shows that the angle of astigmatism varies regularly.

For multifocal or unifocal lenses, the invention allows improvement of the performances of the lenses for wearers having a different NV and FV astigmatism. Taking account of a near-vision measurement allows correction of the astigmatism, even for wearers who do not present a far-vision astigmatism.

As the figures show, the lenses of the examples differ from the lenses of the state of the art by virtue of the regular progression of the astigmatism, in amplitude and/or in axis, along the meridian.

Of course, the invention is not limited to the preferred examples given above. Near-vision prescription measurement in a monocular configuration is thus possible; this solution brings with it the risk that the position of the eye of the wearer does not exactly correspond to the natural position of the eye of the wearer in near vision. Optical definitions of the power and of the astigmatism for each direction of viewing were proposed above; these definitions are particularly suited to the calculation of power and astigmatism using a ray tracing program. Other definitions could be used in worn conditions, such as the definition of astigmatism proposed in B. Bourdoncle et al., *Ray tracing through progressive ophthalmic lenses*, 1990 International Lens Design Conference, D. T. Moore ed., Proc. Soc. Photo. Opt. Instrum. Eng.

In the above examples of optimization, it was proposed to optimize only one of the faces of the lenses. It is clear that in all these examples the role of the front and rear surfaces can be easily switched. The sphere, amplitude or cylinder axis progression can also be allocated to one or the other of the two surfaces of the lens, or partially to one face and the other, as soon as the optical targets described above, in terms of power, axis and astigmatism value are indeed the targets of the optimization which serves to obtain the lens.

It is also possible to use other methods of optimization, and other representations of the surfaces than those proposed. Other targets can be applied for the optimization, for example by allowing corridor widths in the intermediate vision zone, or also angular ranges for the far-vision and near-vision zones.

Other values for the worn conditions than those proposed in the examples can be used; the same is true for the lens index. The minimum or maximum power or the power defined above can be used for the calculations.

The invention claimed is:

1. Method for determination of an ophthalmic lens for a wearer for whom a near-vision and far-vision astigmatism prescription has been made out, the near-vision astigmatism being different from the far-vision astigmatism, the method comprising the steps of;
   choosing a starting lens and defining a current lens equal to the starting lens;
   optimization, in worn conditions, of the current lens using as a target the astigmatism for which the wearer has been given a prescription for far vision and the astigmatism for which the wearer has been given a prescription for near vision.

2. The method of claim 1, in which the astigmatism is measured in a reference frame linked to the eye.

3. The method of claim 1 in which the target also includes a power prescription for the wearer in near vision.

4. The method of claim 1, in which the target also includes a power prescription for the wearer in tar vision.

5. The method of claim 1, in which the optimization comprises the definition of a principal meridian and uses as target a continuous increase in the amplitude of astigmatism along the meridian.

6. The method of claim 1, in which the optimization comprises the definition of a principal meridian and uses as target a continuous progression of the axis of astigmatism along the meridian.

7. A lens obtained by the method of claim 1.

8. A lens for a wearer for whom a near-vision and far-vision astigmatism prescription has been made out, the near-vision astigmatism being different from the far-vision astigmatism, the lens being obtained by a method comprising the steps of:
   choosing a starting lens and defining a current lens equal to the starting lens;
   optimization, in worn conditions, of the current lens using as a target the astigmatism for which the wearer has been given a prescription for far vision and the astigmatism for which the wearer has beer given a prescription for near vision.

9. Method for determination of an ophthalmic lens for a wearer for whom a near-vision and far-vision astigmatism prescription has been made out, the near-vision astigmatism being different from the far-vision astigmatism, the method comprising the steps of:
   choosing a starting lens and defining a current lens equal to the starting lens;
   optimization, in worn conditions, of the current lens as a target the astigmatism for which the wearer has been given a prescription for far vision, and the astigmatism for which the wearer has being giving a prescription for near vision, said near-vision astigmatism prescription being measured in binocular vision.

* * * * *

UNITED STATES PATENT AND TRADEMARK OFFICE
CERTIFICATE OF CORRECTION

PATENT NO. : 7,249,850 B2  Page 1 of 1
APPLICATION NO. : 10/566882
DATED : July 31, 2007
INVENTOR(S) : Berangere Donetti It is certified that error appears in the above-identified patent and that said Letters Patent is hereby corrected as shown below:

Column 11
Claim 4, line 36, replace "tar" with --far--

Column 12
Claim 9, line 32, replace "being giving" with --been given--

Signed and Sealed this

Third Day of March, 2009

JOHN DOLL
*Acting Director of the United States Patent and Trademark Office*